(12) United States Patent
Kim et al.

(10) Patent No.: US 12,394,777 B2
(45) Date of Patent: Aug. 19, 2025

(54) COMPOSITE ELECTRODE FOR A LITHIUM OR LITHIUM-ION BATTERY AND PRODUCTION METHOD THEREFOR

(71) Applicant: Bayerische Motoren Werke Aktiengesellschaft, Munich (DE)

(72) Inventors: Sung-Jin Kim, Munich (DE); Hideki Ogihara, Haimhausen (DE); Nikolaos Tsiouvaras, Munich (DE); Thomas Woehrle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 708 days.

(21) Appl. No.: 17/636,622

(22) PCT Filed: Jul. 17, 2020

(86) PCT No.: PCT/EP2020/070343
§ 371 (c)(1),
(2) Date: Feb. 18, 2022

(87) PCT Pub. No.: WO2021/032380
PCT Pub. Date: Feb. 25, 2021

(65) Prior Publication Data
US 2022/0285661 A1  Sep. 8, 2022

(30) Foreign Application Priority Data
Aug. 19, 2019 (DE) ............ 10 2019 122 226.5

(51) Int. Cl.
*H01M 4/04* (2006.01)
*H01M 4/02* (2006.01)
(Continued)

(52) U.S. Cl.
CPC ......... *H01M 4/043* (2013.01); *H01M 4/0404* (2013.01); *H01M 4/366* (2013.01);
(Continued)

(58) Field of Classification Search
CPC .................... H01M 4/043; H01M 4/0435
See application file for complete search history.

(56) References Cited

U.S. PATENT DOCUMENTS

| 2003/0087152 A1 | 5/2003 | Shindo et al. |
| 2008/0206631 A1* | 8/2008 | Christensen ...... H01M 10/0525 429/188 |

(Continued)

FOREIGN PATENT DOCUMENTS

| CN | 109004171 A | 12/2018 |
| KR | 10-2014-0137660 A | 12/2014 |
| KR | 10-2019-0064480 A | 6/2019 |

OTHER PUBLICATIONS

International Search Report (PCT/ISA/210) issued in PCT Application No. PCT/EP2020/070343 dated Oct. 14, 2020 with English translation (five (5) pages).
(Continued)

*Primary Examiner* — Barbara L Gilliam
*Assistant Examiner* — Jordan E Berresford
(74) *Attorney, Agent, or Firm* — Crowell & Moring LLP

(57) ABSTRACT

A method for producing a composite electrode for a lithium or lithium-ion battery comprises: providing a current collector having a main surface; forming a first electrode layer on the main surface of the current collector, wherein a first adhesion is formed between the current collector and the first electrode layer along the main surface; forming a second electrode layer on the first electrode layer, wherein the first and second electrode layer contact each other along a contact surface opposite the main surface of the current collector, the second electrode layer is adhesively connected to the first electrode layer along the contact surface; and compressing the first and second electrode layer by means of a compression device, wherein, during the compressing, a pressure element of the compression device exerts a pressure
(Continued)

on at least one part of the surface of the second electrode layer opposite the contact surface, and a second adhesion can form between the pressure element and the part of the second electrode layer on which the pressure is exerted, wherein the ratio between the first adhesion and the second adhesion resulting from the compression is greater than one.

13 Claims, 3 Drawing Sheets

(51) Int. Cl.
    *H01M 4/36*     (2006.01)
    *H01M 4/525*     (2010.01)
    *H01M 4/587*     (2010.01)
    *H01M 4/62*     (2006.01)
    *H01M 4/66*     (2006.01)
    *H01M 10/0525*     (2010.01)

(52) U.S. Cl.
    CPC ........... *H01M 4/525* (2013.01); *H01M 4/587* (2013.01); *H01M 4/623* (2013.01); *H01M 4/625* (2013.01); *H01M 4/661* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 2012/0052379 A1 | 3/2012 | Roh et al. |
| 2012/0177990 A1 | 7/2012 | Mitsuhashi et al. |
| 2019/0027740 A1 | 1/2019 | Lee et al. |
| 2019/0139714 A1 | 5/2019 | Shin et al. |
| 2019/0165358 A1* | 5/2019 | Haga ................... H01M 10/052 |
| 2021/0119200 A1 | 4/2021 | Nam |

OTHER PUBLICATIONS

German-language Written Opinion (PCT/ISA/237) issued in PCT Application No. PCT/EP2020/070343 dated Oct. 14, 2020 (10 pages).

German-language Search Report issued in German Application No. 10 2019 122 226.5 dated Apr. 29, 2020 with partial English translation (12 pages).

* cited by examiner

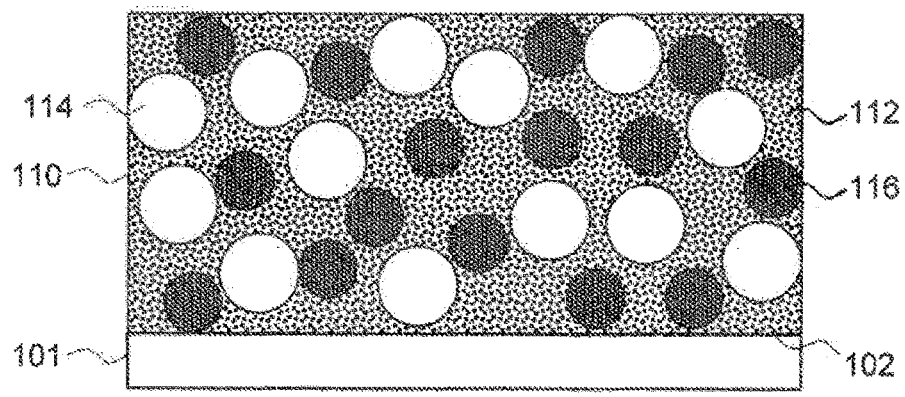
Fig. 2a
Fig. 2b
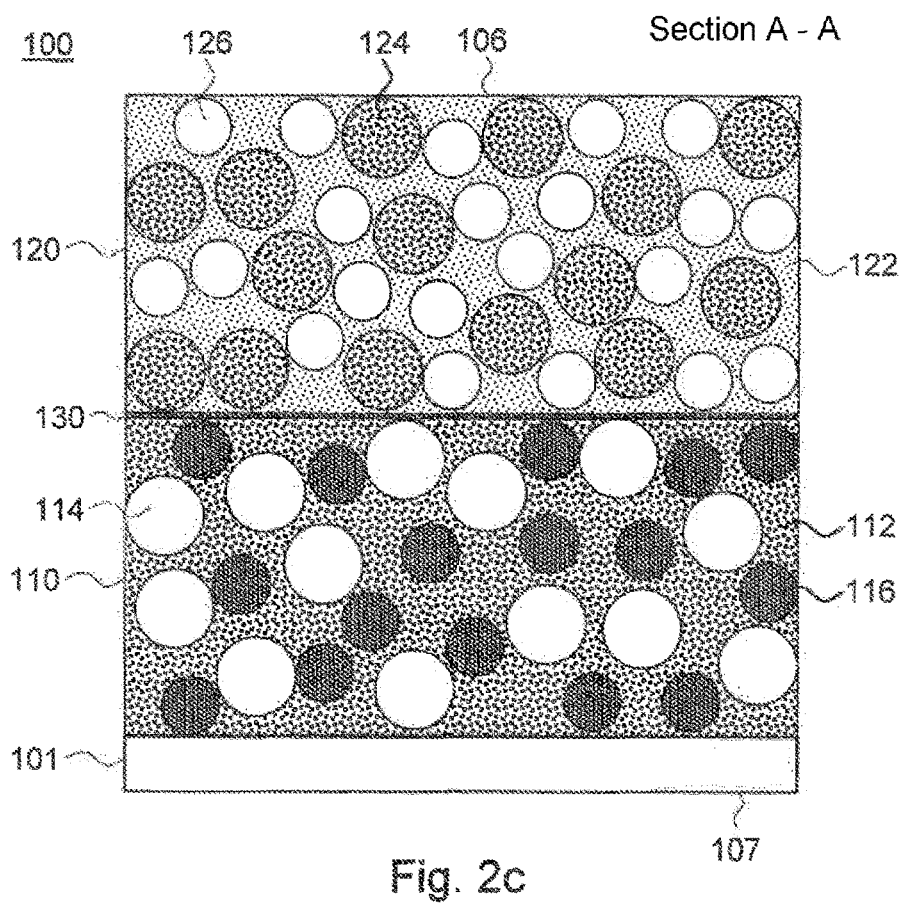
Fig. 2c

COMPOSITE ELECTRODE FOR A LITHIUM OR LITHIUM-ION BATTERY AND PRODUCTION METHOD THEREFOR

BACKGROUND AND SUMMARY OF THE INVENTION

The present invention relates to a method for producing a composite electrode for a lithium or lithium-ion battery. The invention further relates to a composite electrode for a lithium or lithium-ion battery and to a lithium or lithium-ion battery cell having such a composite electrode.

Lithium or lithium-ion batteries achieve comparatively high energy densities. They can be in the form of a cell stack or wound cells. Wound cells in particular can be realized at high speed and with low costs. A lithium or lithium-ion battery contains at least one positive electrode and one negative electrode, which are separated from one another by a separator. The electrodes each have a metal-containing current collector which usually has a foil-like or planar form. The collectors used are usually aluminum foils in the case of positive electrodes and usually copper foils in the case of negative electrodes.

Electrodes are usually produced by application of a layer of a viscous electrode material to the main face of a foil-like or planar current collector. The electrode material can be a mixture of active material, conductive additive and an electrode binder/binding agent. The current collector can be provided as a strip or roll which passes through a coating device in which the electrode coating material is applied as a layer to the current collector strip by means of a nozzle, for example. After the composite electrode material applied on the current collector strip has dried (after the carrier solvent thereof has escaped), the electrode material can be compressed by calendering. This involves guiding the electrode material-coated current collector strip through a gap which is formed by two rotating rollers and which is smaller than the starting thickness of the electrode material-coated current collector strip. Calendering can set a defined porosity of the coating. A general description of lithium-ion technology can be found in chapter 9, written by Thomas Wöhrle, of the book "*Handbuch Lithium-Ionen-Batterien*" [Handbook of lithium ion batteries], Springer, 2013, publisher: Reiner Korthauer.

The adherence between the electrode material layer and the current collector is generally brought about by the binder contained in the electrode material. Accordingly, said binder is chosen such that it ensures a consistently good adherence of the electrode material layer to the current collector consisting of metal or containing metal. For example, the binder used for the bonding/adherence of a graphite-based anode material to a copper-based current collector is PVdF (polyvinylidene fluoride), SBR (styrene-butadiene rubber), CMC (carboxymethylcellulose) or acrylate. The binder used for the bonding of a ceramically based cathode material to an aluminum current collector can be, for example, PVdF.

When the electrode material applied on the current collector strip is compressed by calender rollers, portions of the electrode material may detach from the layer and remain adherent to the roller. As a result, the electrode loses active material, which leads to a reduction in its nominal capacity and reliability. Furthermore, complex cleaning steps must be carried out in the production process to clean the calender roller, which makes the production process more expensive and/or slower. In addition, there may be an increase in rejects in electrode production.

Particularly in the case of highly compressed electrodes (especially anodes) in which use is made of a binder which brings about a very strong adherence of the electrode material to the current collector, portions may detach from the electrode material layer and remain adherent to one of the calender rollers during calendering. Specifically, what is brought about by the binder used is not only a strong adherence of the electrode material layer to the current collector, but also a strong adherence of the electrode material to one of the calender rollers. If the adherence to the calender roller is comparable to or stronger than the adherence to the current collector, the electrode material may detach from the current collector.

It is therefore an object of the present invention to specify a method for producing a composite electrode for a lithium or lithium-ion battery that is performable in a rapid and reliable manner while simultaneously retaining the nominal electrode load, the nominal electrode density and the required nominal properties with respect to energy density and service life. In particular, the method may prevent portions of the electrode material from being torn out of the electrode material layer applied on the current collector and from remaining adherent to the calender roller when the composite electrode is compressed by means of calender rollers.

It is a further object of the present invention to provide a composite electrode for a lithium or lithium-ion battery that can be produced rapidly and reliably while simultaneously retaining the nominal electrode load, the nominal electrode density and the required nominal properties with respect to energy density and service life.

It is a further object of the present invention to provide a lithium or lithium-ion battery having improved properties.

The preceding objects may be achieved according to the teachings of the independent and dependent claims.

In a first aspect, the invention provides a method for producing a composite electrode for a lithium or lithium-ion battery, comprising: providing a foil-like or planar current collector having a main face; forming a first electrode layer on the main face of the current collector, wherein the first electrode layer comprises a first active material and forms a first adherence between the current collector and the first electrode layer along the main face; forming a second electrode layer on the first electrode layer, wherein the first and second electrode layer are mutually touching along a contact face which lies opposite the main face of the current collector, and the second electrode layer comprises a second active material and is adherently connected to the first electrode layer along the contact face; and compressing the first and second electrode layer using a compression device, wherein, during the compression, a pressure element of the compression device exerts a pressure on at least a portion of the face of the second electrode layer that lies opposite the contact face, and a second adherence can form between the pressure element and the portion of the second electrode layer on which the pressure is exerted, wherein the ratio between the first adherence and the second adherence which arises as a result of the compression is greater than one.

As a result, a production method can be provided in which, during the compression, there is a reduction in the probability of portions of the first electrode layer detaching from the current collector and remaining adherent to the pressure element. The composite electrode can therefore be produced more easily and more rapidly with retention of the nominal properties with respect to energy density and service life.

In the context of the present invention, adherence/strength of adherence between two layers/phases in contact is to be understood to mean the force necessary for (at least partial) separation of the two layers/phases in contact. What can contribute to adherence is the adhesion between the two layers in contact, but also the quality, especially the roughness, of the surfaces in contact. Adhesion is to be understood to mean the forces which push/press the two mutually touching layers against one another. Said forces can be caused by a molecular interaction between the mutually touching layers in the contact face (interface) and can be substantially independent of the roughness of the mutually touching surfaces.

Methods for measuring the adherence/strength of adherence between two layers/phases in contact are known to a person skilled in the art, and so they will not be further considered in detail. The adherence measurement measured by a measurement method can depend on the measurement method used. Therefore, in the context of the present invention, adherence (strength of adherence) measurements should be ascertained/measured using the same method.

In a preferred embodiment, the ratio between the first adherence and the second adherence which arises as a result of the compression is greater than two, preferably greater than five.

As a result, the probability of portions of the first electrode layer detaching from the current collector during the compression can be yet further reduced.

In a preferred embodiment, the second electrode layer completely covers the face of the first electrode layer that lies opposite the main face of the current collector.

As a result, the first electrode layer can be prevented from coming into contact with the pressure element and from being able to form an adherence between the first electrode layer and the surface of the pressure element during the compression. Because there is no formation of (direct) adherence of the first electrode layer to the pressure element—which might be much stronger than the adherence of the second electrode layer to the pressure element—the probability of portions of the first electrode layer detaching from the current collector during the compression can likewise be reduced.

In a preferred embodiment, the first electrode layer further comprises a first conductive additive and a first binder, wherein the first binder, firstly, binds the first active material and the first conductive additive and, secondly, forms the first adherence between the first electrode layer and the current collector; and/or the second electrode layer further comprises a second conductive additive and a second binder, wherein the second binder binds the second active material and the second conductive additive; the adherent connection between the first electrode layer and the second electrode layer is formed along the contact face thereof by the first binder and/or the second binder.

As a result, firstly, the electrical conductivity of the first and/or second electrode layer can be increased; and, secondly, the adherence between active material and conductive additive within an electrode layer, the adherence between the electrode layers, and the adherence between the first electrode layer and the current collector can be set as required.

In a preferred embodiment, the first electrode layer contains the first active material and the first conductive additive in the form of particles, and a third adherence develops between them and the first binder, the second electrode layer contains the second active material and the second conductive additive in the form of particles, and a fourth adherence develops between them and the second binder, and the second adherence between the pressure element and the second electrode layer, said second adherence arising as a result of the compression, is lower than the third adherence, lower than the fourth adherence and lower than the adherent connection between the first and second electrode layer.

As a result, during the compression, it is possible to prevent: portions from being torn out of the first electrode layer, portions of the second electrode layer or the entire second electrode layer from detaching from the first electrode layer, and portions from being torn out of the second electrode layer. As a result, the pressure element can remain free of particles of the electrode material and need not be cleaned. In particular, however, the properties of the composite electrode with respect to energy density and service life may be retained.

In a preferred embodiment, the first binder and the second binder are based on different substances. For example, the first binder is based on polyvinylidene fluoride (PVdF) and/or the second binder is based on polytetrafluoroethylene (PTFE).

As a result, the first and the second binder can have different adhesion properties, which can facilitate discovery of the appropriate/optimal first and second binder for a composite electrode.

In a preferred embodiment, the first binder and the second binder are based on identical substances, but the concentration of the first binder in the first electrode layer is higher than the concentration of the second binder in the second electrode layer. For example, the first and second binder may be based on polyvinylidene fluoride (PVdF).

Concentration of a binder in the context of the present invention is to be understood to mean the proportion of said binder in the electrode layer to which it belongs. Said proportion can be specified in percentages by weight (% by weight). The concentration of any component of an electrode layer (active material, conductive additive or binder) is specified as the proportion of said component in the electrode layer to which it belongs.

As a result, the same binder or binding agent can be used for the first and second binder, and the different adherences (within an electrode layer, between the electrode layers and between the first electrode layer and the current collector) can be realized by different concentrations of the binding/binding agent in the respective electrode layer.

In a preferred embodiment, the formation of the first electrode layer comprises: mixing the first active material, the first conductive additive and the first binder to form a first substance mixture, and applying the first substance mixture to the main face of the current collector; and the formation of the second electrode layer comprises: mixing the second active material, the second conductive additive and the second binder to form a second substance mixture, and applying the second substance mixture to the first electrode layer, upon or after the application of the second substance mixture, the first binder and the second binder flow into one another at the contact face between the first and second electrode layer.

As a result, the adherence between the first and the second electrode layer along the contact face thereof can be improved.

In a preferred embodiment, the thickness of the first substance mixture applied to the main face of the current collector is different from that of the second substance mixture applied to the first electrode layer.

As a result, a composite electrode according to the invention having different electrode layer thicknesses can be produced.

In a preferred embodiment, the thickness of the first substance mixture applied to the main face of the current collector is smaller than the thickness of the second substance mixture applied to the first electrode layer.

As a result, a composite electrode according to the invention having an increased energy density can be produced.

In a preferred embodiment, the first active material and the second active material are identical or different.

As a result, discovery of the appropriate first and second active material for the composite electrode can be facilitated.

In a preferred embodiment, the face of the pressure element that exerts the pressure on the second electrode layer during the compression has a roughness, the average roughness, Ra, of which is less than 1 µm, or the mean roughness depth, Rz, of which is less than 2 µm.

As a result, the adherence of the second electrode layer to the pressure element can be reduced and, thus, the detachment of the first electrode layer from the current collector and/or the tear-out of portions of the electrode material during the compression can be reduced/prevented.

In a preferred embodiment, the compression device contains calender rollers, and the pressure element is the calender roller which comes into contact with the second electrode layer during the compression.

As a result, the compression device can be realized.

In a second aspect, the invention provides a composite electrode for a lithium or lithium-ion battery, obtainable by a method according to the invention.

As a result, a composite electrode can be provided which cannot be damaged during the compression by detachment of the first electrode layer from the current collector and/or by tear-out of portions of electrode material from the first and/or second electrode layer; and which can thus have a high energy density and long service life.

In a third aspect, the invention provides a composite electrode for a lithium or lithium-ion battery, comprising: a foil-like or planar current collector having a main face and a surface material forming the main face, wherein the main face has a roughness; a first electrode layer which is formed on the main face of the current collector, wherein the first electrode layer comprises a first active material and a first binder, the first binder has a first adherence with respect to the main face of the current collector and forms, via said first adherence, an adherence of the first electrode layer to the current collector; a second electrode layer which is formed on the face of the first electrode layer that lies opposite the main face of the current collector, wherein the second electrode layer comprises a second active material and a second binder, the second binder has a second adherence with respect to a reference surface which has the surface material and the roughness of the main face of the current collector, and the first binder and/or the second binder forms an adherent connection between the first electrode layer and the second electrode layer along the contact face thereof; wherein the ratio between the first adherence of the first binder and the second adherence of the second binder is greater than one.

As a result, a composite electrode can be provided in which the probability of it having points at which the first electrode layer is detached from the current collector is distinctly reduced.

In a preferred embodiment, the ratio between the first adherence of the first binder and the second adherence of the second binder is greater than two, preferably greater than five.

As a result, the probability of the composite electrode having points at which the first electrode layer is detached from the current collector can be further reduced.

In a preferred embodiment, the first electrode layer further comprises a first conductive additive and the first binder binds the first active material and the first conductive additive; and/or the second electrode layer further comprises a second conductive additive and the second binder binds the second active material and the second conductive additive.

As a result, firstly, the first and/or second electrode layer can have an increased electrical conductivity; and, secondly, the adherence between active material and conductive additive within an electrode layer, the adherence between the electrode layers, and the adherence between the first electrode layer and the current collector can be in line with specified requirements.

In a preferred embodiment, the roughness of the main face has an average roughness, Ra, which is greater than 1 µm, and/or the roughness of the main face has a mean roughness depth, Rz, which is greater than 2 µm.

As a result, the first electrode layer can adhere more strongly to the current collector and, thus, the probability of the composite electrode having points at which the first electrode layer is detached from the current collector can likewise be reduced.

In a preferred embodiment, the first binder and the second binder are based on different substances. For example, the first binder is based on polyvinylidene fluoride (PVdF) and/or the second binder is based on polytetrafluoroethylene (PTFE).

As a result, the first and the second binder can have different adhesion properties, and the desired adherence within an electrode layer, between the electrode layers and between the first electrode layer and the current collector can be substantially achieved by the different adhesion properties.

In a preferred embodiment, the first binder and the second binder are based on identical substances, but the concentration of the first binder in the first electrode layer is higher than the concentration of the second binder in the second electrode layer. For example, the first and second binder are based on polyvinylidene fluoride (PVdF).

As a result, the desired adherence within an electrode layer, between the electrode layers and between the first electrode layer and the current collector can be realized by different concentrations of the same binder/binding agent.

In a preferred embodiment, the composite electrode is a cathode and the first binder and/or the second binder is one of the following or a combination of the following: polar-modified PVdF>polyethylene oxide (PEO)>polyvinylidene fluoride (PVdF)>polyvinylidene fluoride hexafluoropropylene copolymer (PVdF-HFP)>polyvinylpyrrolidone (PVP)>polytetrafluoroethylene (PTFE), the sign ">" indicating that the aluminum-adherence of the binder before the sign ">" is greater than the aluminum-adherence of the binder after the sign ">". In the list, polar-modified PVdF thus has the strongest adherence to aluminum and polytetrafluoroethylene the weakest adherence.

As a result, the advantages of an organic binder system can be used in the production of an electrode; or the electrode itself has the advantages of such a system.

In a preferred embodiment, the composite electrode is an anode and the first binder and/or the second binder is one of the following or a combination of the following: polyacrylate>styrene-butadiene rubber (SBR)>carboxymethylcellulose (CMC)>polyvinylpyrrolidone (PVP), aqueous PVdF emulsion>aqueous PVdF-HFP emulsion>polytetrafluoroethylene (PTFE), the sign ">" indicating that the copper-adherence of the binder before the sign ">" is greater than the copper-adherence of the binder after the sign ">". In the list, acrylate thus has the strongest adherence to copper and polytetrafluoroethylene the weakest adherence.

As a result, the advantages of an aqueous binder system can be used in the production of an anode; or the anode itself has the advantages of such a system.

In a preferred embodiment, the composite electrode is a cathode and the first binder and/or the second binder is one of the following or a combination of the following: polar-modified PVdF>polyethylene oxide (PEO)>polyvinylidene fluoride (PVdF)>polyvinylidene fluoride hexafluoropropylene copolymer (PVdF-HFP)>polyvinylpyrrolidone (PVP) >>polytetrafluoroethylene (PTFE).

As a result, the advantages of an organic binder system can be used in the production of a cathode; or the cathode itself has the advantages of such a system.

In a preferred embodiment, the composite electrode is a cathode and the first binder and/or the second binder is one of the following or a combination of the following: polyacrylate>styrene-butadiene rubber (SBR)>polyvinylpyrrolidone (PVP)>aqueous PVdF emulsion>aqueous PVdF-HFP emulsion>polytetrafluoroethylene (PTFE).

As a result, the advantages of an aqueous binder system can be used in the production of an cathode; or the cathode itself has the advantages of such a system.

Binders/binding agents having higher adhesion with respect to the surface material of the current collector can be used as first binder, and binders having lower adhesion with respect to the surface material of the current collector can be used as second binder.

In a preferred embodiment, the thickness of the first electrode layer is smaller than the thickness of the second electrode layer.

As a result, the composite electrode can have an increased energy density.

In a fourth aspect, the invention provides a lithium-ion or lithium battery cell having a composite electrode according to the invention.

As a result, a lithium-ion or lithium battery cell having a high energy density and long service life can be provided.

There follows a description of preferred embodiments of the invention and developments thereof, which can be respectively in any combination with one another and with the further other aspects of the invention described, unless this is expressly ruled out or is technically impossible.

Further advantages, features and application possibilities of the present invention are revealed by the following detailed description in conjunction with the figures.

BRIEF DESCRIPTION OF THE DRAWINGS

FIG. 2a schematically shows a current collector of the composite electrode;

FIG. 2b schematically shows a first electrode layer formed on the current collector;

FIG. 2c schematically shows an electrode layer stack which contains the current collector, the first electrode layer, and a second electrode layer formed on said first electrode layer;

DETAILED DESCRIPTION OF THE DRAWINGS

Figure 1:
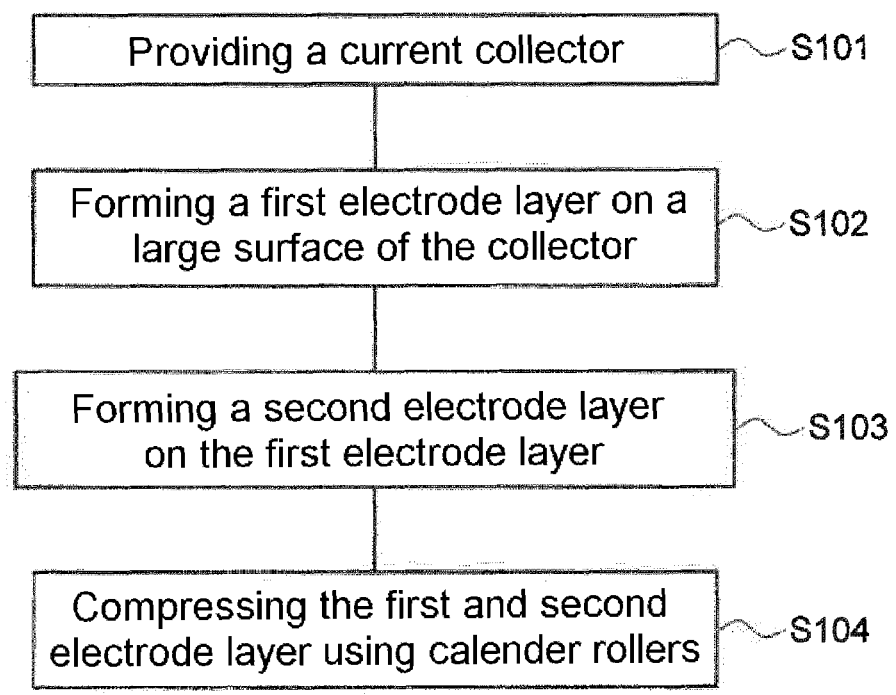
FIG. 1 schematically shows a method for producing a composite electrode according to an embodiment of the present invention.
Figure 2D:
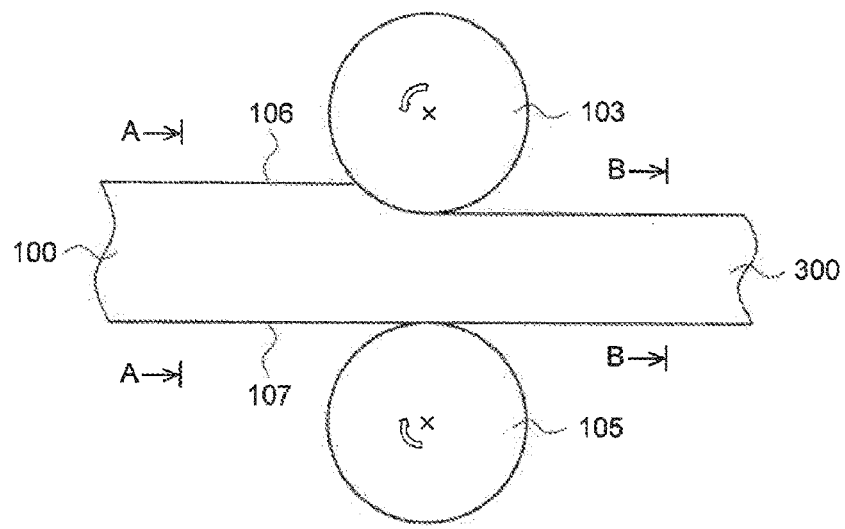
FIG. 2d schematically shows the compression of the electrode layer stack.

FIG. 1 schematically shows a method for producing a composite electrode for a lithium or lithium-ion battery and FIGS. 2a to 2d illustrate in schematic form the individual steps of the method.

In a step S101, a foil-like or planar current collector 101 having a main face 102 is provided. The main face 102 of the current collector 101 preferably has a roughness with an average roughness, Ra, of at least 1 µm, or a roughness with a mean roughness depth, Rz, of at least 2 µm. The surface of the current collector 101 that forms the main face 102 may comprise metal. The metal is preferably copper or nickel if the composite electrode to be produced is an anode, or aluminum if the composite electrode to be produced is a cathode.

In a step S102, a first electrode layer 110 is formed on the main face 102 of the current collector 101. The first electrode layer 110 can comprise: a first active material 114, a first conductive additive 116, and a first binder 112 for binding of the first active material 114 and the first conductive additive 116. The first active material 114 and the first conductive additive 116 can be contained in the first electrode layer 110 in the form of particles. What can develop between the first binder 112 and the particles of the first active material 114 and the first conductive additive 116 is an adherence (the third adherence described above) which ultimately leads to the binding of the first active material and the first conductive additive. In addition, the first binder 112 must be chosen such that it ensures the formation of an adherence/adhering force between the first electrode layer 110 and the current collector 101.

The formation of the first electrode layer, S102, can comprise the following substeps: mixing the first active material 114, the first conductive additive 116 and the first binder 112 to form a first substance mixture; and applying the first substance mixture to the main face 102 of the current collector 101. The first binder used for the first substance mixture can be in a dissolved state in a solvent. The application of the first substance mixture to the main face of the current collector can be effected in a coating machine by means of a nozzle. After the application of the first substance mixture to the main face 102 of the current collector 101, what can follow is drying of the first electrode layer 110. After the drying of the first electrode layer 110, the first binder 112 must ensure an adherence (the first adherence described above) of the first electrode layer 110 to the current collector 101.

In a step S103, a second electrode layer 120 is formed on the first electrode layer 110. Preferably, the second electrode layer 120 can completely cover the face of the first electrode layer 110 that lies opposite the main face 102 of the current collector 101. The second electrode layer 120 can comprise: a second active material 124, a second conductive additive 126, and a second binder 122 for binding of the second active material 124 and the second conductive additive 126. The second active material 124 and the second conductive additive 126 can be contained in the second electrode layer 120 in the form of particles. What can develop between the second binder 122 and the particles of the second active material 124 and the second conductive additive 126 is an adherence (the fourth adherence described above) which ultimately leads to the binding of the second active material and the second conductive additive. In addition, the first binder 112 and/or second binder 122 must be chosen such that it/they ensure(s) the formation of an adherent connection between the first electrode layer 110 and the second electrode layer 120 along the contact face 130 thereof.

The formation of the second electrode layer, S103, can comprise the following substeps: mixing the second active material 124, the second conductive additive 126 and the second binder 122 to form a second substance mixture; and applying the second substance mixture to the face of the first electrode layer 110 that lies opposite the main face of the current collector. The second binder used for the second substance mixture can be in a dissolved state in a solvent. The application of the second substance mixture to the first electrode layer 110 and the application of the first electrode layer 110 to the current collector 101 in step 102 can be effected virtually simultaneously. This may involve first applying the first electrode layer 110 to the current collector 101 in the coating machine using a first nozzle and subsequently applying the second electrode layer 120 to the still undried first electrode layer 110 using a second nozzle situated at a short distance from the first nozzle. Thereafter, the drying of the first and second electrode layer can be effected. Because the first electrode layer is still undried upon the application of the second electrode layer, both electrode layers can flow into one another at the contact face 130 thereof, which leads to a better adherence between the two layers after the drying.

The second substance mixture can alternatively be applied to a dry first electrode layer 110. In this case, the first electrode layer 110 can swell with the (wet) second electrode layer 120 at the contact face 130 and make it possible for the two layers to flow into one another at the contact face 130. After the application of the second substance and flow of the first and second electrode into one another at the contact face 130, the drying of the second electrode layer 120 can be effected. After the drying, the first binder 112 and/or the second binder 122 may ensure an adherent connection between the first electrode layer 110 and the second electrode layer 120.

Figure 3:
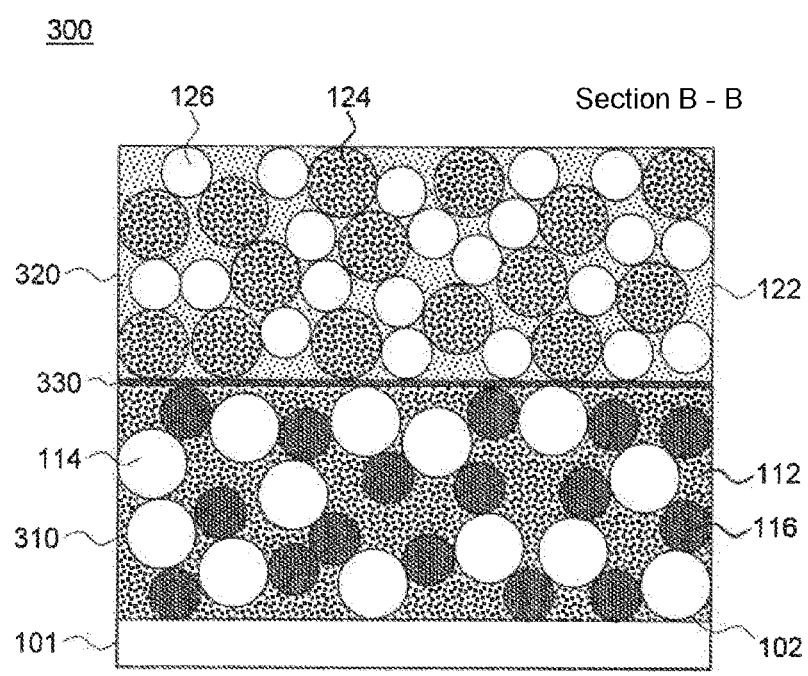
FIG. 3 schematically shows a composite electrode according to an embodiment of the present invention.

In a step S104, the compression of the first electrode layer 110 and the second electrode layer 120 may be effected using the calender rollers 103 and 105. This step is hereinafter also referred to simply as calendering. The calendering involves the layer stack 100 formed from the current collector 101, the first electrode layer 110 and the second electrode layer 120 being guided through the gap formed by the calender rollers 103 und 105. As a result of the calendering, the first and second electrode layer are compressed and the thickness of the layer stack 300 after the calendering is thus reduced. FIG. 2c shows a section of the layer stack 100 in the plane A-A, i.e., before the calendering; and FIG. 3 shows a section of the layer stack 300 in the plane B-B, after the calendering. The effect of the calendering is elucidated in FIG. 3 by the particles of the active material and the conductive additive in both electrode layers moving closer together and adjacent particles mutually touching more frequently than is the case in FIG. 2c.

The calendering involves the roller 103 exerting on the face 106 of the layer stack 100 a pressure that can lead to an adherence between the calender roller 103 and the face 106 which has come into contact therewith. Because the face 106 of the layer stack 100 is simultaneously also a (top) face of the second electrode layer 120, said adherence is substantially mediated by the second binder 120. As a result of said adherence, portions of the first and/or second electrode layer can be torn out of the layer composite 100 and remain adherent to the calender roller 103. The adherence between calender roller 103 and the second electrode layer 120 can depend on the material quality and the roughness of the calender roller 103 and on the adhesion properties of the second binder 120. However, whether a portion of the first and/or second electrode layer is torn out of the layer composite 100 or not also depends on the adherence within the layers, the adherence between the layers, and the adherence between first electrode layer 110 and current collector 101—and thus also on the first binder 112.

Therefore, in the method according to the invention for producing a composite electrode, the first binder 112 and the second binder 122 are chosen such that the ratio between the adherence between current collector 101 and first electrode layer 110 and the adherence between calender roller 103 and the second electrode layer 120 is greater than one. The greater this ratio, the lower the probability of portions of the first electrode layer 110 detaching from the current collector 101 during the calendering. Therefore, in a preferred embodiment of the method according to the invention, the ratio between the adherence between current collector 101 and first electrode layer 110 and the adherence between calender roller 103 and the second electrode layer 120 is greater than two, in particular greater than five. It would be optimal if, during the calendering, the face of the second electrode layer 120 that has come into contact with the calender roller 103 does not adhere to the calender roller 103, i.e., the adherence between calender roller 103 and the second electrode layer 120 is equal to zero, and thus the ratio between the adherence between current collector 101 and first electrode layer 110 and the adherence between calender roller 103 and the second electrode layer 120 may be infinite.

Furthermore, it is advantageous to choose the first and second binder such that the second adherence between the calender roller 103 and the second electrode layer 120 that arises as a result of the compression is lower than the adherence between the first active material 114 and the first conductive additive 116 (third adherence) that is mediated by the first binder 112, lower than the adherence between the second active material 124 and the second conductive additive 126 (fourth adherence) that is mediated by the second binder 122, and lower than the adherent connection between the first and second electrode layer. The lower the second adherence compared to the third adherence, the fourth adherence and the adherent connection between the two electrode layers, the lower the probability of portions of the first and/or second electrode layer being torn out of the layer composite 100 and remaining hanging on the calender roller 103 during the calendering.

The first binder 112 and the second binder 122 can be based on different substances/binding agents. For example, the first binder is PVdF-based and the second binder is PTFE-based.

The first binder 112 and the second binder 122 can also be based on the same substance/binding agent, but they differ in their concentration in that the concentration of the first binder 112 in the first electrode layer 110 is higher than the concentration of the second binder 122 in the second electrode layer 120. For example, the first binder and the second binder are PVdF-based.

The first active material 114 and the second active material 124 can be identical or different.

Because the adherence between calender roller 103 and the second electrode layer 120 can also depend on the roughness of the calender roller 103, it is advantageous if it has a roughness which is less than the roughness of the main face 102 of the current collector 101. Preferably, the roughness of the calender roller 103 has an average roughness, Ra, which is less than 1 µm, or a mean roughness depth, Rz, which is less than 2 µm.

The first and second electrode layer can have different thicknesses. For example, the thickness of the second electrode layer 120 can be greater than that of the first electrode layer 110. This embodiment can be especially advantageous if the concentration of the second binder 122 is lower than the concentration of the first binder 112. Specifically then, the proportion of the first and second active material in the composite electrode can be higher than in the case of a composite electrode in which the thicknesses of the first and second electrode layer are identical.

FIG. 3 shows the cross section of a composite electrode according to the invention for a lithium or lithium-ion battery. The composite electrode 300 according to the invention can be produced by the above-described method according to the invention for producing a composite electrode and comprises a current collector 101, a first electrode layer 310, and a second electrode layer 320 formed on said first electrode layer 310.

The current collector 101 can be foil-like or planar, and has a main face 102 and a surface material which forms the main face and which may contain metal. The metal can be copper or nickel if the composite electrode 300 is an anode; or aluminum if the composite electrode 300 is a cathode. The current collector 101 can also be entirely made of the metal contained in the surface material. It is advantageous if the main face of the current collector has a roughness, the average roughness, Ra, of which is at least 1 µm, or the mean roughness depth, Rz, of which is at least 2 µm.

The first electrode layer 310 is formed on the main face 102 of the current collector 101 and comprises a first active material 114, a first conductive additive 116 and a first binder 112. The first active material 114 and the first conductive additive 116 can be contained in the first electrode layer 310 in the form of particles. The first binder 112 can bind the first active material 114 and the first conductive additive 116 and has a first adherence with respect to the main face 102 of the current collector 101. Via said first adherence, the first binder 112 can form an adherence between the first electrode layer 310 and the current collector 101 at its main face.

The second electrode layer 320 is formed on the first electrode layer 310, on a face which lies opposite the main face 102 of the current collector 101; and comprises a second active material 124, a second conductive additive 126 and a second binder 122. The second active material 124 and the second conductive additive 126 can be contained in the second electrode layer 320 in the form of particles. The second binder 122 can bind the second active material 124 and the second conductive additive 126 and has a second adherence with respect to a face which has the surface material and the roughness of the main face 102 of the current collector 101 (also called reference face).

The first and second electrode layer are mutually touching and adhere to one another along a contact face 130. This adherent connection is formed by the first binder 112 and/or the second binder 122.

According to the invention, the first binder 112 and the second binder 122 are chosen such that the ratio between the first adherence of the first binder and the second adherence of the second binder is greater than one, preferably greater than 2, in particular greater than five. If the first and second binder are chosen in this way, there is a very low probability, when producing the composite electrode 300 and especially when compressing it, of the first electrode layer being detached from the current collector at any point. In addition, there is a low probability of the composite electrode 300 having points in the first and/or second electrode layer that lack active material and/or conductive additive.

The first binder 112 and the second binder 122 can be based on different substances. For example, the first binder may be based on polyvinylidene fluoride (PVdF) and the second binder may be based on polytetrafluoroethylene (PTFE).

The first binder 112 and the second binder 122 can also be based on identical substances, but in this case the concentration of the first binder in the first electrode layer may be higher than the concentration of the second binder in the second electrode layer. For example, the first and second binder may be based on polyvinylidene fluoride (PVdF).

The first active material 114 and the second active material 124 can be identical or different.

In a composite electrode according to the invention, the first electrode layer 310 and the second electrode layer 320 can have different layer thicknesses. For example, the thickness of the second electrode layer 320 can be greater than that of the first electrode layer 310. Such a composite electrode may be advantageous if the concentration of the second binder is lower than the concentration of the first binder. Specifically then, the composite electrode can accommodate more active material than a composite electrode which corresponds thereto, but in which the thicknesses of the first and second electrode layer are identical.

The composite electrode 300 can be an anode or cathode of a lithium or lithium-ion battery.

The exemplary embodiments shown in what follows relate to the method according to the invention for producing a composite electrode for lithium or lithium-ion batteries. The materials used for the production of the respective composite electrodes are specified in Tables 1 to 4. Moreover, each table specifies the median particle size d50 for the active material and the conductive additive and also the concentration of each material in percentages by weight (% by weight). The concentration of a material is based on the proportion of said material in an electrode layer. In the tables, an electrode layer is referred to simply as a layer and the current collector is referred to simply as a collector.

FIRST EXEMPLARY EMBODIMENT

The first exemplary embodiment relates to an anode for a lithium or lithium-ion battery. The metal used for the current collector/collector, the composition of the first substance mixture applied to the main face of the current collector to form the first electrode layer, and the composition of the second substance mixture applied to the first electrode layer to form the second electrode layer are specified in the first row of Table 1. As can be gathered from the table, the binders used in the first and second electrode layer are based on different substances (PVdF or PTFE). The active materials used in the first and second electrode layer are identical (graphite). The same can be said for the conductive additives (conductive carbon black).

TABLE 1

| Anode Collector | First layer | | | Second layer | | |
|---|---|---|---|---|---|---|
| | Active material | Conductive additive | Binder | Active material | Conductive additive | Binder |
| Cu | Graphite MCMP 25-28 (Osaka Gas) d50 = 25 μm 92% by weight | Conductive carbon black Super P (Imerys) d50 = 50 nm 2% by weight | HSV 900 PVdF (ARKEMA) 6% by weight | Graphite MCMP 25-28 (Osaka Gas) d50 = 25 μm 92% by weight | Conductive carbon black Super P (Imerys) d50 = 50 nm 2% by weight | PTFE (SOLVAY) 6% by weight |
| Ni | Graphite MCMP 25-28 (Osaka Gas) d50 = 25 μm 92% by weight | Conductive carbon black Super P (Imerys) d50 = 50 nm 2% by weight | HSV 900 PVdF (ARKEMA) 6% by weight | Graphite MCMP 25-28 (Osaka Gas) d50 = 25 μm 92% by weight | Conductive carbon black Super P (Imerys) d50 = 50 nm 2% by weight | PTFE (SOLVAY) 6% by weight |

SECOND EXEMPLARY EMBODIMENT

The second exemplary embodiment differs from the first exemplary embodiment only in the metal used for the current collector. The materials used are specified in the second row of Table 1.

THIRD EXEMPLARY EMBODIMENT

The third exemplary embodiment relates to a cathode for a lithium or lithium-ion battery. The metal used for the current collector, the composition of the first substance mixture applied to the current collector to form the first electrode layer, and the composition of the second substance mixture applied to the first electrode layer to form the second electrode layer are specified in Table 2. The binders used in the first and second electrode layer are based on different substances (PVdF or PTFE). The active materials used in the first and second electrode layer are identical. The same can be said for the conductive additives.

TABLE 2

| Cathode Collector | First layer | | | Second layer | | |
|---|---|---|---|---|---|---|
| | Active material | Conductive additive | Binder | Active material | Conductive additive | Binder |
| Al | LiCoO$_2$ (Kd-10, Umicore) d50 = 10 μm 93% by weight | Conductive carbon black Super P (Imerys) d50 = 50 nm 3% by weight | SOLEF 5130 PVdF (Solvay) 4% by weight | LiCoO$_2$ (Kd-10, Umicore) d50 = 15 μm 93% by weight | Conductive carbon black Super P (Imerys) d50 = 50 nm 3% by weight | PTFE (SOLVAY) 4% by weight |

FOURTH EXEMPLARY EMBODIMENT

The fourth exemplary embodiment relates to an anode for a lithium or lithium-ion battery. The metal used for the current collector, the composition of the first substance mixture applied to the current collector to form the first electrode layer, and the composition of the second substance mixture applied to the first electrode layer to form the second electrode layer are specified in the first row of Table 3. As can be gathered from the table, the binders used in the first and second electrode layer are based on the same substance (PVdF), but have different concentrations in the respective electrode layers. The active materials used in the first and second electrode layer are identical (graphite). The same can be said for the conductive additives (conductive carbon black).

TABLE 3

| Anode Collector | Binder | First layer | | | Second layer | | |
|---|---|---|---|---|---|---|---|
| | | Active material | Conductive additive | Binder conc. | Active material | Conductive additive | Binder conc. |
| Cu | SOLEF 5130 PVdF (Solvay) | Graphite Hitachi MAGE | Conductive carbon black Super P | 5.5% by weight | Graphite Hitachi MAGE d50 = 20 μm | Conductive carbon black Super P | 3.5% by weight |

TABLE 3-continued

| | | First layer | | | Second layer | | |
|---|---|---|---|---|---|---|---|
| | Anode | Active | Conductive | Binder | Active | Conductive | Binder |
| Collector | Binder | material | additive | conc. | material | additive | conc. |
| Ni | SOLEF 5130 PVdF (Solvay) | d50 = 20 μm 93% by weight Graphite Hitachi MAGE d50 = 20 μm 93% by weight | 1.5% by weight Conductive carbon black Super P 1.5% by weight | 5.5% by weight | 95% by weight Graphite Hitachi MAGE d50 = 20 μm 95% by weight | 1.5% by weight Conductive carbon black Super P 1.5% by weight | 3.5% by weight |

FIFTH EXEMPLARY EMBODIMENT

The fifth exemplary embodiment differs from the fourth exemplary embodiment only in the metal used for the current collector. The materials used are specified in the second row of Table 3.

SIXTH EXEMPLARY EMBODIMENT

The sixth exemplary embodiment relates to a cathode for a lithium or lithium-ion battery. The metal used for the current collector, the composition of the first substance mixture applied to the current collector to form the first electrode layer, and the composition of the second substance mixture applied to the first electrode layer to form the second electrode layer are specified in Table 4. The binders used in the first and second electrode layer are based on the same substance (PVdF), but have different concentrations in the respective electrode layers. The active materials used in the first and second electrode layer are identical. The same can be said for the conductive additives.

TABLE 4

| | | First layer | | | Second layer | | |
|---|---|---|---|---|---|---|---|
| | Cathode | Active | Conductive | Binder | Active | Conductive | Binder |
| Collector | Binder | material | additive | conc. | material | additive | conc. |
| Al | SOLEF 5130 PVdF (Solvay) | LiCoO$_2$ (Kd-10, Umicore) d50 = 15 μm 93% by weight | Conductive carbon black Super P (Imerys) d50 = 50 nm 3% by weight | 4% by weight | LiCoO$_2$ (Kd-10, Umicore) d50 = 15 μm 95% by weight | Conductive carbon black Super P (Imerys) d50 = 50 nm 3% by weight | 2% by weight |

LIST OF REFERENCE SIGNS

100 Electrode layer stack
101 Current collector (foil)
102 Main face of the current collector
103 First (upper) calender roller
105 Second (lower) calender roller
106 Face of the electrode stack which touches the first calender roller
107 Face of the electrode stack which touches the second calender roller
110 First electrode layer
112 First binder
114 First active material
116 First conductive additive
120 Second electrode layer
122 Second binder
124 Second active material
126 Second conductive additive
130 Connection face between the first and second electrode layer
300 Composite electrode
310 First electrode layer of the composite electrode
320 Second electrode layer of the composite electrode
330 Connection face between the two electrode layers of the composite electrode

What is claimed is:

1. A method for producing a composite electrode for a lithium or lithium-ion battery, comprising:
   providing a foil-like or planar current collector having a main face;
   forming a first electrode layer on the main face of the current collector, wherein the first electrode layer comprises a first active material and a first binder and forms a first adherence between the current collector and the first electrode layer along the main face;
   forming a second electrode layer on the first electrode layer, wherein the first and second electrode layer are mutually touching along a contact face which lies opposite the main face of the current collector, and the second electrode layer comprises a second active material and a second binder and has an adherent connection to the first electrode layer along the contact face; and
   compressing the first and second electrode layer using a compression device, wherein, during the compression, a pressure element of the compression device exerts a pressure on at least a portion of the face of the second electrode layer that lies opposite the contact face, a face of the pressure element having a roughness comprising a mean roughness depth, Rz, of less than 2 μm, and a second adherence forms between the pressure element and the portion of the face of the second electrode layer on which the pressure is exerted, and
   wherein a ratio between the first adherence and the second adherence which arises as a result of the compression is greater than one.

2. The method according to claim 1, wherein the ratio between the first adherence and the second adherence which arises as a result of the compression is greater than two.

3. The method according to claim 2, wherein the ratio between the first adherence and the second adherence which arises as a result of the compression is greater than five.

4. The method according to claim 1, wherein the first electrode layer further comprises a first conductive additive, wherein the first binder, firstly, binds the first active material and the first conductive additive and, secondly, forms the first adherence between the first electrode layer and the current collector, and/or wherein the second electrode layer further comprises a second conductive additive, wherein the second binder binds the second active material and the second conductive additive, wherein the adherent connection between the first electrode layer and the second electrode layer is formed along the contact face thereof by the first binder and/or the second binder.

5. The method according to claim 4, wherein the first electrode layer contains the first active material and the first conductive additive in the form of particles, and a third adherence develops between the particles and the first binder, wherein the second electrode layer contains the second active material and the second conductive additive in the form of particles, and a fourth adherence develops between the particles and the second binder, and wherein the second adherence arising as a result of the compression is lower than the third adherence, lower than the fourth adherence and lower than the adherent connection between the first and second electrode layer.

6. The method according to claim 5, wherein the first binder and the second binder comprise different substances.

7. The method according to claim 5, wherein the first binder and the second binder comprise identical substances, but the concentration of the first binder in the first electrode layer is higher than the concentration of the second binder in the second electrode layer.

8. The method according to claim 4, wherein forming the first electrode layer comprises:
mixing the first active material, the first conductive additive and the first binder to form a first substance mixture, and
applying the first substance mixture to the main face of the current collector; and
wherein forming the second electrode layer comprises:
mixing the second active material, the second conductive additive and the second binder to form a second substance mixture, and
applying the second substance mixture to the first electrode layer,
wherein, upon or after the application of the second substance mixture, the first binder and the second binder flow into one another at the contact face between the first and second electrode layer.

9. The method according to claim 1, wherein the first active material and the second active material are identical.

10. The method according to claim 1, wherein the first active material and the second active material are different.

11. The method according to claim 1, wherein the roughness comprises an average roughness, Ra, of less than 1 μm.

12. The method according to claim 1, wherein the compression device includes calender rollers, and wherein the pressure element is the calender roller which comes into contact with the portion of the face of the second electrode layer during the compression.

13. A composite electrode for a lithium or lithium-ion battery made by the method according to claim 1.

* * * * *